United States Patent [19]

Okumura et al.

[11] Patent Number: 4,569,039
[45] Date of Patent: Feb. 4, 1986

[54] OPTICAL INFORMATION OUTPUT DEVICE

[75] Inventors: Ichiro Okumura, Tokyo; Yoshifumi Nishimoto, Machida, both of Japan

[73] Assignee: Canon Kabushiki Kaisha, Tokyo, Japan

[21] Appl. No.: 394,789

[22] Filed: Jul. 2, 1982

[30] Foreign Application Priority Data

Jul. 13, 1981 [JP] Japan .................. 56-109014

[51] Int. Cl.⁴ .............................................. G11B 7/00
[52] U.S. Cl. ....................................... 369/44; 369/45; 250/201; 250/202
[58] Field of Search ............... 369/44, 45; 250/201, 250/202, 201 R, 201 DP; 350/374, 355

[56] References Cited

U.S. PATENT DOCUMENTS

| | | | |
|---|---|---|---|
| 3,932,700 | 1/1976 | Snopko | 369/45 |
| 3,985,952 | 10/1976 | Adler | 369/44 |
| 4,037,929 | 7/1977 | Bricot | 369/45 |
| 4,124,273 | 11/1978 | Huignard | 369/45 |
| 4,322,837 | 3/1982 | Mickleson | 369/44 |
| 4,453,801 | 6/1984 | Verber | 350/96.12 |

OTHER PUBLICATIONS

Nikkei Electronics Publication of 10/13/80.

Primary Examiner—Alan Faber
Attorney, Agent, or Firm—Fitzpatrick, Cella, Harper & Scinto

[57] ABSTRACT

An optical output device comprising a deflector having an electrooptic crystal element provided with an electrode and controlling an electric field applied to the electrode to vary the deflection angle of a light beam passing through the crystal and projecting the beam upon a predetermined position on a recording medium and separating the reflected light from the recording medium from the light beam or/and a variable focal length lens consisting of an electrooptic crystal and which uses a condenser for controlling the focal length of the lens by an electric field applied to the crystal and focusing the light beam to the recording medium, thereby reducing the number of mechanically movable parts of the device.

4 Claims, 2 Drawing Figures

OPTICAL INFORMATION OUTPUT DEVICE

BACKGROUND OF THE INVENTION

1. Field of the Invention

This invention relates to an optical information input-output device which is a pickup optical system of an optical information recording apparatus or reproducing apparatus such as a video disc, a photomemory or a photomagnetic memory.

2. Description of the Prior Art

To record information on an optical information recording medium such as a video disc, a photomemory or a photomagnetic memory or to reproduce the information from the recording medium, there is required an optical system of the construction as shown, for example, in FIG. 1 of the accompanying drawings. That is, in such optical information input-output device of the prior art, a laser light emitted from a laser light source 1 is collimated by a collimater lens 2, passes through a polarizing beam splitter 3 and is converted from a linearly polarized light into a circularly polarized light by a quarter wavelength plate 4. This light is further reflected by a pivoting mirror 5 for tracking control and is condensed through an objective lens 6 onto the surface of an information recording disc 7 such as a video disc or a photomemory. The light reflected by the disc 7 travels back along the aforementioned route and is converted into a linearly polarized light by the quarter wavelength plate 4, and then is reflected in the polarizing beam splitter 3 toward a photodiode 8. Isolation of the light is accomplished by the polarizing beam splitter 3 and the quarter wavelength plate 4 so that the light reflected by the disc 7 is prevented from entering the light source 1 and is directed to the photodiode 8. In the photodiode 8, the information on the disc 7 can be read by the intensity of the light.

The pivoting mirror 5 has its pivotal movement mechanically controlled in the direction of arrow by a magnetic field formed by an electric current so that the light is oscillated radially of the disc 7. The vibration of the track resulting from the eccentricity, vibration or the like of the disc 7 is detected by some means and the pivoting mirror 5 is operated by this tracking error signal so that the spot of the laser light does not deviate from a predetermined track on the surface of the disc 7.

The objective lens 6 has the function of condensing the laser light into a spot of a diameter of the order of 1 μm on the disc 7 and is mechanically movable perpendicularly to the disc 7 by a magnetic field formed by an electric current. Also, this objective lens 6 is controlled in accordance with focus error information so that the spot diameter always becomes smallest on the surface of the disc 7 for vibration of the disc 7 in the direction of the optical axis.

Thus, in the device of the prior art, various control means are mechanically accomplished, for example, by a current magnetic field, and this has led to a great number of parts and a great amount of consumed power and moreover, the responsiveness of the device has been limited.

Also, in the device of the prior art, as previously mentioned, a polarizing beam splitter and a quarter wavelength plate have been required for separating the laser light and the reflected light of the laser light from the disc, and this has led to the high cost of the device and has been disadvantageous in making the device compact.

SUMMARY OF THE INVENTION

It is an object of the present invention to provide an optical information input-output device having a small number of mechanical control means.

It is another object of the present invention to provide an optical information input-output device which is inexpensive and compact.

The present invention achieves these objects by an optical information input-output device which comprises a light source, condenser means for condensing a light beam emitted from the light source onto a recording medium, a light-receiving element for detecting the reflected light of the light beam reflected by the recording medium, and deflector means disposed between the light source and the recording medium and including an electrooptic crystal element provided with an electrode, the deflector means controlling an electric field applied to the electrode and varying the deflection angle of the light beam from the light source by the crystal element and projecting the light beam upon a predetermined position on the recording medium while, at the same time, separating the reflected light of the light beam from the recording medium from the light beam by the electrooptic crystal element and directing the reflected light to the light-receiving element.

According to another aspect of the present invention, there is provided an optical information input-output device which comprises a light source, deflector means for varying the deflection angle of a light beam emitted from the light source and projecting the light beam upon a predetermined position on a recording medium, and condenser means including a variable focal length lens consisting of an electrooptic crystal, the condenser means controlling the focal length of the lens by an electric field applied to the crystal and focusing the light beam to the recording medium.

The invention will become more fully apparent from the following detailed description thereof taken in conjunction with the accompanying drawings.

DESCRIPTION OF THE PREFERRED EMBODIMENTS

Figure 1:
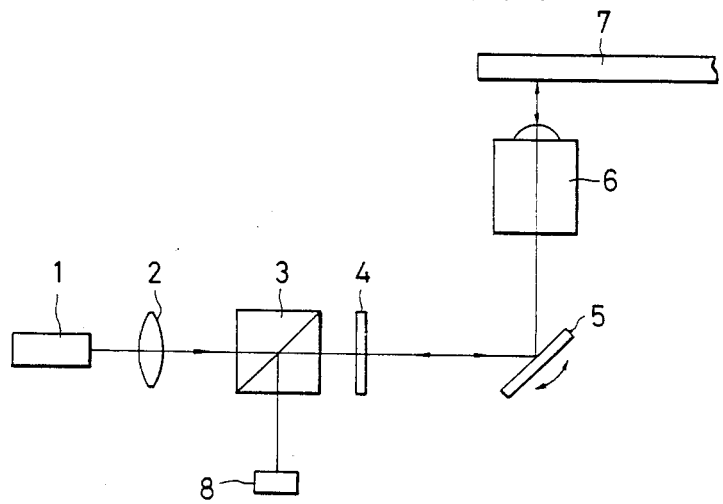
FIG. 1 is a schematic view showing the construction of the optical information input-output device of the prior art.
Figure 2:
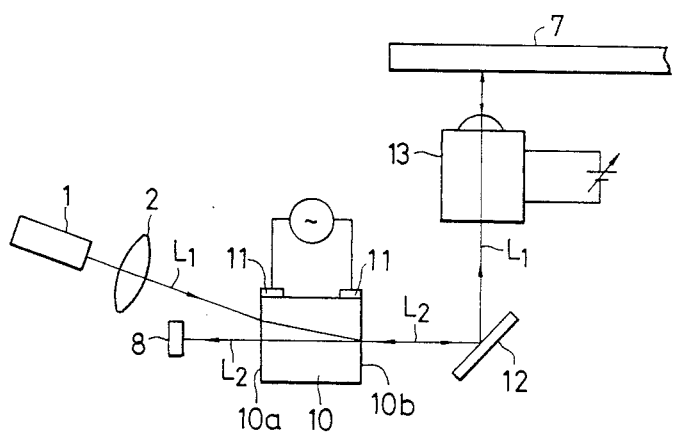
FIG. 2 is a schematic view showing an example of the construction of the optical information input-output device of the present invention.

Referring to FIG. 2, deflector means 10 including an electrooptic element consisting of a crystal of lithium niobate ($LiNbO_3$) or the like has a pair of interdigital electrodes 11 provided on one surface of the electrooptic element in the fashion of intersecting fingers. A high-frequency electric field is applied to the interdigital electrodes. In an electrooptic element such as lithium niobate or the like, it is known that when a high-frequency electric field is applied to the crystal by an electrode in intimate contact with the crystal in a particular direction thereof, the light linearly polarized in the particular direction is changed in its direction of travel. The deflection angle thereof can be varied by the intensity or frequency of the electric field applied. A laser light $L_1$ emitted from a laser light source 1 through a collimater lens 2 is obliquely incident on one surface 10a of the electrooptic element 10. The voltage or frequency applied to the electrodes 11 is controlled in accordance with tracking error information obtained by another means, and the laser light $L_1$ which has been incident is deflected a predetermined angle. A stationary mirror 12 is disposed on the other surface 10b of the electrooptic element 10 so as to direct the laser light $L_1$ through condenser means 13 to the surface of a disc 7 which is an optical information recording medium. A light-receiving photodiode 8 is disposed on the surface 10a side of the electrooptic element 10 on an extension passing through the electrooptic element 10 and the mirror 12.

Accordingly, when the laser light $L_1$ emitted from the light source 1 is obliquely incident on the surface 10a of the electrooptic element 10 through the collimater lens 2, it is deflected in accordance with the controlled electric field applied to the electrooptic element 10. This laser light $L_1$ is emitted toward an intended track on the disc 7 and is applied as a tiny spot onto the surface of the disc 7 through the stationary mirror 12 and condenser means 13. The reflected laser light $L_2$ of the laser light $L_1$ applied onto the disc 7 includes information recorded on the disc 7, and travels back along the optical path to the surface 10b of the electrooptic element 10. However, this reflected laser light $L_2$ is reverse in its direction of travel and therefrom is not deflected by the electrooptic element 10 but travels rectilinearly to the photodiode 8, and thus the information is read. The optical path of the laser light source 1 and the collimater lens 2 differs from the optical path of the photodiode 8 and therefore, the reflected laser light $L_2$ never returns to the light source, etc.

Accordingly, in the present embodiment, the light isolation function and the deflection of light for tracking control are performed by a single electrooptic crystal element, and this leads to a reduction in the number of mechanical control means as well as to the possibility of eliminating the polarized beam splitter, the quarter wavelength plate, etc. used for the separation of reflected light in the prior art device, which in turn is advantageous in making the device compact and reducing the cost of the device.

Also, from the reflected laser light $L_2$, a tracking error signal for controlling the aforementioned voltage or frequency can be obtained by the photodiode 8.

In FIG. 2, condenser means 13 is a variable focal length lens consisting of a crystal having a first-order or a second-order electrooptic effect such as $KH_2PO_4$. The variable focal length lens using the electrooptic crystal varies the refractive index of the crystal by an electric field applied to the electrooptic crystal and varies the focal length of the lens. Such variable focal length lens is proposed, for example, in U.S. Pat. No. 4,453,801 issued Jun. 12, 1984 and need not be described in detail.

In the present embodiment, instead of the mechanical movement of the conventional objective lens, the refractive index of the above-described electrooptic crystal is electrically controlled in accordance with the focus error information by a power source as shown in FIG. 2, whereby the laser light $L_1$ is controlled so that the spot diameter becomes smallest on the surface of the disc 7. Again, the focus error information can be obtained from the reflected laser light $L_2$ by the photodiode 8.

Thus, the reproducing device of the above-described embodiment of the present invention can control the laser light without using any mechanical movement. The optical information recording device can also employ an optical system of the same construction. In this case, the photodiode 8 is used solely for obtaining the tracking error signal and the focus error signal and is not used for reading the information.

In the above-described embodiment, electrooptic crystal has been used for both the deflector means and the condenser means and an optical information input-output device using no mechanical movement has been realized, but the purposes of reducing the number of mechanical control means and making the device inexpensive and compact can also be fully achieved by using only one of the deflector means and condenser means of the described embodiment in the conventional optical information input-output device.

The present invention permits various applications including the above-described use. For example, in the above-described embodiment, the optical path of the laser light has been changed by the use of the stationary mirror 12, but the laser light may be made directly incident on and emergent from the condenser means 13 without using the stationary mirror 12. Also, the photodiode 8 may be replaced by another light-receiving element such as a phototransistor or the like. Such applications are all included in the present invention as far as they do not depart from the scope of the invention as defined by the appended claims.

As described above, the optical information input-output device according to the present invention is reduced in the number of movable parts and other parts and the pick-up thereof is compact and light in weight, which also leads to the possibility of constructing the device inexpensively. It also consumes a reduced amount of electric power. Further, the present invention has the advantage that the tracking control or/and the focus control become more rapid.

What we claim is:

1. An optical information output device comprising:
    a light source for emitting a linearly polarized light beam;
    condenser means for condensing the light beam emitted from said light source onto a recording medium;
    a light-receiving element for detecting a reflected light beam resulting from reflection of said emitted light beam by said recording medium; and
    deflector means disposed between said light source and said recording medium, said deflector means including an electrooptic crystal element in the paths of the emitted and reflected light beams and means for applying an electric field to said electrooptic crystal element in a predetermined direction relative to the direction of polarization of the emitted light beam thereby to deflect the emitted light beam and project said emitted light beam on said recording medium, wherein said electrooptic crystal element is oriented relative to the reflected light beam for transmitting said reflected light beam through said electrooptic crystal element substantially without deflection to separate the paths of the reflected and emitted light beams and direct said reflected light beam to said light-receiving element.

2. The device according to claim 1, wherein a tracking error signal associated with said light beam is detected by said light-receiving element and said deflector means is controlled by said tracking error signal.

3. The device according to claim 1, wherein said condenser means is a variable focal length lens using an electrooptic crystal, and the focal length of said lens is controlled to focus said light beam to said recording medium.

4. The device according to claim 3, wherein a tracking error signal and focusing error signal of said light beam are detected by said light-receiving element, said deflector means is controlled by said tracking error signal, and the focal length of said variable focal length lens is controlled by said focusing error signal.

* * * * *